(12) United States Patent
Bookbinder et al.

(10) Patent No.: US 6,273,990 B1
(45) Date of Patent: Aug. 14, 2001

(54) METHOD AND APPARATUS FOR REMOVING A PROTECTIVE COATING FROM AN OPTICAL FIBER AND INHIBITING DAMAGE TO SAME

(75) Inventors: Dana C. Bookbinder, Corning; Mark L. Morrell, Horseheads, both of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/340,482

(22) Filed: Jun. 30, 1999

Related U.S. Application Data

(60) Provisional application No. 60/091,259, filed on Jun. 30, 1998.

(51) Int. Cl.[7] .................................................... B32B 35/00
(52) U.S. Cl. ........................... 156/344; 156/584; 81/9.4; 81/9.41; 30/90.1; 30/346.53; 29/566.4; 7/107; 401/139; 401/265
(58) Field of Search ................................. 150/247, 344, 150/584; 81/9.4, 9.51, 9.41, 9.42, 9.43, 9.44; 29/33.52, 564.4, 566.4; 30/90.1, 346.53; 7/107; 401/50, 139, 265

(56) References Cited

U.S. PATENT DOCUMENTS

| | | | |
|---|---|---|---|
| 4,059,892 | 11/1977 | Siden | 30/90.1 |
| 4,748,871 * | 6/1988 | Zdzislaw | 81/9.4 |
| 4,973,129 | 11/1990 | Fukuzawa et al. | 350/96.33 |
| 5,298,105 | 3/1994 | Dorsey | 156/584 |
| 5,306,378 * | 4/1994 | Takimoto et al. | 156/344 |
| 5,450,513 | 9/1995 | Bookbinder et al. | 385/48 |

FOREIGN PATENT DOCUMENTS

WO 95/13994   5/1995   (WO) .

* cited by examiner

*Primary Examiner*—Mark A. Osele
(74) *Attorney, Agent, or Firm*—Philip G. Alden; Eric M. Smith

(57) ABSTRACT

A method for mechanically stripping the protective coating from a silica or glass optical fiber using a polymeric or soft metal blade having a hardness less than that of the glass optical fiber but greater than the protective coating. The blade is preferably selected from a group of polymeric materials, or alternately a soft metal, which is selected or treated so as to not detrimentally oxidize in conventional operating environments. For a silica-containing optical fiber, the blade has a hardness of less than approximately 125 on the Knoop hardness scale, and preferably less than approximately 60 on the Knoop hardness scale. A method of inhibiting damage to the exposed region of the silica-containing optical fiber comprises applying a substance that forms a protective layer to provide a barrier to particulates and moisture, and which does not inhibit subsequent processing of the optical fiber, selected from a group of silane-containing compounds.

18 Claims, 8 Drawing Sheets

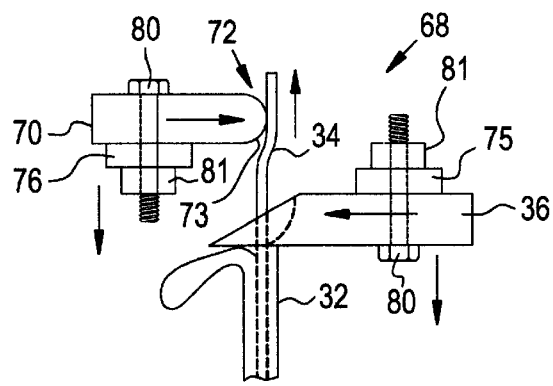
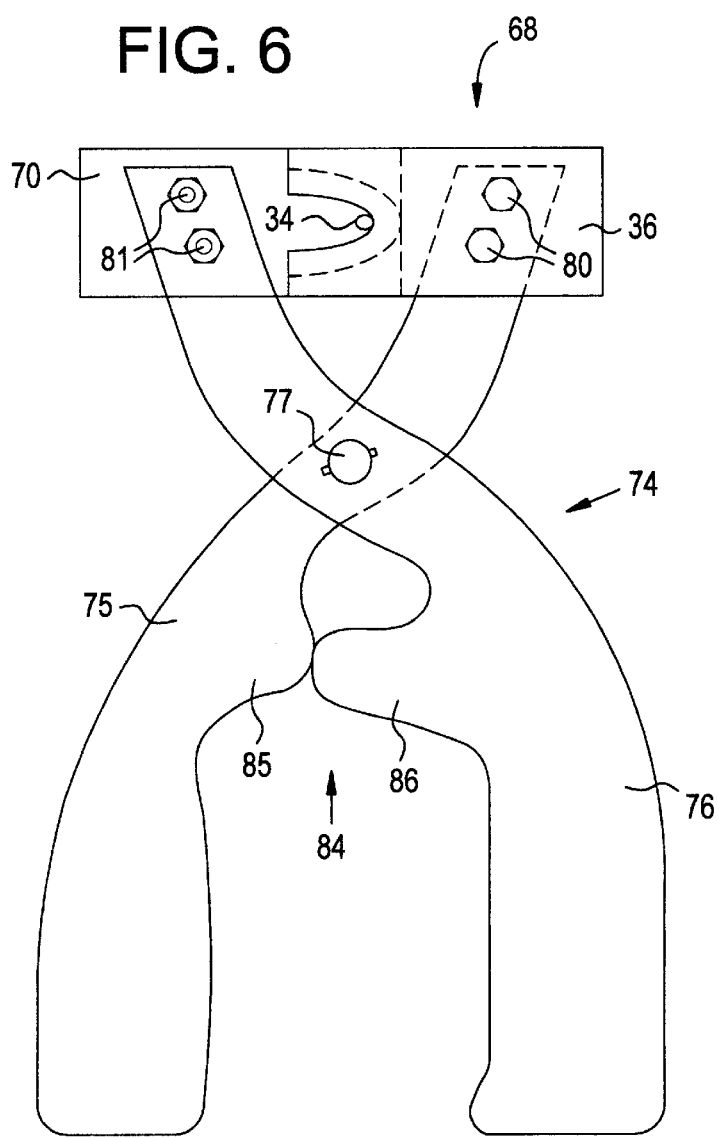
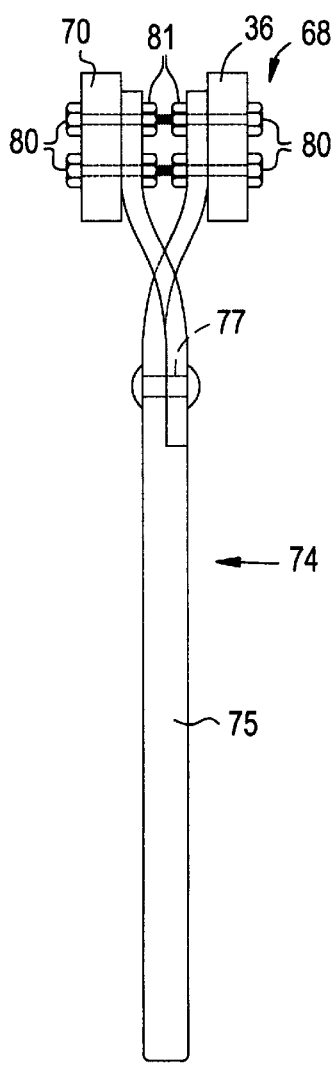

METHOD AND APPARATUS FOR REMOVING A PROTECTIVE COATING FROM AN OPTICAL FIBER AND INHIBITING DAMAGE TO SAME

This application claims the benefit of priority under 35 USC § 120 from the U.S. Provisional Application Ser. No. 60/091,259, filed on Jun. 30, 1998.

BACKGROUND OF THE INVENTION

1. Field of the Invention

The present invention relates to methods and apparatuses for removing a protective coating from an optical fiber, and in particular to a method and apparatus for removing the protective coating from a silica or glass optical fiber without scoring or abrading the optical fiber, and further a method for inhibiting damage to the optical fiber.

2. Technical Background

Optical fiber manufacturers typically cover an optical fiber with one or more protective polymer coatings. Technicians routinely remove the outer protective coating from the optical fiber to make splices, attach connectors, pigtail the fiber to an optical component, or use the exposed portion of the optical fiber in fabricating an optical component. Removing or "stripping" the outer protective layer can be accomplished in a variety of ways, including contact stripping (such as mechanical or chemical processes) and non-contact stripping (such as a hot gas jet).

In many situations, mechanical stripping processes are generally preferred, particularly when the optical fiber must be stripped manually or in the field.

Concurrent with the advent of optical fiber, mechanical stripping tools similar in form and function to conventional wire-strippers were developed. In one example, a stripping tool having a deformable polymer or soft metal blade was suggested for use both with copper wire and acrylic optical fiber. Mechanical stripping tools generally provided a grooved or notched blade, with an adjustable diameter corresponding to that of the wire or optical fiber.

Glass or silica optical fibers quickly became the standard for fiber-optic communications, due to the exceedingly low attenuation or loss in the 1.3 nm and 1.55 nm wavelength transmission windows.

However, silica or glass optical fibers could be easily scored or abraded by mechanical stripping blades, resulting in weakening and breaking of fibers. Nicked or scored fibers could break due to tension or flexion well after connections were made, requiring significant time to track and repair the fault. Conventional stripping blades often damaged the optical fiber and reduced its tensile strength. For example, a coated optical fiber typically has a tensile strength of 600 to 800 Kpsi. Removing the polymer coating with a conventional fiber-stripping tool may cause the strength of the optical fiber to drop to 100 Kpsi or lower. Optical fibers having a tensile strength below 100 Kpsi are often considered unsuitable for use.

As such, significant emphasis has been devoted to increasing the precision and reliability of mechanical stripping equipment and processes.

One approach is to maintain strict tolerances for the alignment and position of the guides, gripping elements, stripping blades, and mandrels used in strippers. However, these tolerances can be difficult to monitor or adjust, and the blades must be maintained in optimal condition. Sharpening a blade perturbs the operational tolerances, as does using a dulled blade. In additional, accurate mechanical strippers do not conform easily to a variety of fiber diameters or coating types.

Consequently, other approaches have been employed in combination with mechanical stripping tools or equipment in order to lessen the required tolerances, as well as mitigate against damaging the glass optical fiber.

In particular, chemical-, thermal-, or radiation-softening processes have been developed to lower the hardness or modulus of the protective coating and permit it to be stripped more easily (thus allowing the blade of the stripping tool to remain displaced slightly from the surface of the glass optical fiber).

While functional, these processes suffer from several drawbacks, such as requiring additional equipment and supplies to operate, being more time consuming and labor intensive, allowing less portability and therefore less applicability for use in the field or outside a controlled manufacturing environment, and being more susceptible to variability in the softening process itself.

Similar techniques have also been employed to completely remove the protective coating from the optical fiber, but apart from non-contact stripping processes these chemical and thermal contact stripping processes can adversely affect the optical fiber, leave residues that degrade transmission, adhesion, or splicing, and have other undesirable side-effects. These adverse results similarly occur when the processes are used in combination with a mechanical stripping blade.

For example, chemical stripping involves using chemicals such as methylene chloride or hot concentrated sulfuric acid. This approach does not provide sufficiently precise control over the amount or depth of coating stripped from the optical fiber, or the affect of the chemical on the optical fiber itself. The chemical often removes the coating outside the desired stripping area because it cannot be prevented from flowing along the optical fiber underneath the coating. Once the coating has been stripped, chemical residue remaining on the optical fiber prevents the optical fiber from being coated again. Further, this chemical process cannot be used in the field because the chemicals are dangerous and hard to handle, technicians in the field lack adequate training or qualifications, and the chemicals require a significant amount of time (on the order of thirty minutes) to remove the coating from a typical optical fiber.

Another approach to improving mechanical stripping of glass optical fibers has been to use a blade fabricated from a "softer" non-metallic material such as graphite. However, it is difficult to characterize the relative "softness" of graphite and reproduce blades of uniform quality, since graphite is a general term covering a large range of carbon structures having various physical properties, including hardness. If a graphite composition of requisite softness is selected, it may be difficult to maintain an accurate edge on the blade without frequent sharpening and adjustment. The edge of the blade itself may be subject to damage which might not be visible to the technician, but which would increase the potential risk of damaging the fiber. In addition, while graphite may be considered "soft" at a macroscopic level, it is relatively "hard" at the microscopic level, having a crystalline-like structure that cleaves to form very sharp, acute hard edges which can micro-score or abrade the optical fiber, again resulting in the same weakening and breakage potential as a conventional hard metal blade.

Conventional mechanical fiber-stripping tools thereby create an unacceptable reliability problem, since they periodically produce optical fibers having a reduced tensile strength that is unsuitable for use. Though testing the tensile strength of the stripped optical fibers could diminish the reliability problem, technicians often cannot perform such testing. And even if unsuitable optical fibers could be reliably identified, the conventional fiber-stripping tool remains disadvantageous because it wastes the time needed to test and restrip the fiber (as well as the fiber itself).

Furthermore, in addition to the disadvantages discussed above regarding chemical and thermal stripping techniques, the conventional fiber-stripping tools and processes do not accommodate for preventing damage to the optical fiber after the protective coating layer has been removed. The bare optical fiber can be damaged by incidental contact, or even airborne particulates that lodge on its surface and create flaws. The optical fiber can also be damaged if moisture is allowed to contact the surface of the optical fiber.

SUMMARY OF THE INVENTION

In one aspect, the present invention provides for a mechanical stripping process or apparatus in which the hardness of the blade is less than that of the silica or glass optical fiber (to prevent scoring or abrading the optical fiber upon incidental contact), but is also harder than the protective coating to be removed. Various polymeric and soft metal materials are discussed as being suitable alternatives for practicing the present invention.

In another aspect, the present invention utilizes the discovery that certain soft metals otherwise suitable for fabricating blades for mechanically stripping silica or glass optical fiber oxidize upon exposure to normal operating environments, and this layer of oxidation increases the hardness of the blade to a degree where it is no longer suitable for stripping glass optical fiber without the risk of damage and unsuitable tensile strengths. As such, certain polymeric materials are deemed preferable for practicing the method or fabricating the apparatus of the present invention in some applications, or alternatively soft metals, which are selected or treated so as to not detrimentally oxidize in conventional operating environments.

A further aspect of the present invention includes a method for preventing or minimizing damage to the exposed glass optical fiber subsequent to stripping the protective coating layer.

As embodied and broadly described herein, the invention comprises a method of removing a protective coating from a glass optical fiber a ambient temperatures and without applying a chemical softening agent including the steps of providing a tool having a blade with a lower hardness than the glass optical fiber but higher than the protective coating, engaging the protective coating with the portion of the blade, and applying force to the blade relative to the coating so as to cause the protective coating to be removed from the glass optical fiber.

The invention further comprises an apparatus for removing a protective coating from a silica-containing optical fiber, the apparatus including a blade and a tool configured to grip the optical fiber and engage the blade against the optical fiber when removing the protective coating, a portion of the blade having a hardness less than 125 on the Knoop hardness scale.

The invention further comprises a method for preventing or inhibiting damage to the exposed portion of a stripped optical fiber including the step of applying a substance to at least the exposed portion of the optical fiber to form a protective layer that provides a barrier to at least one of either particulates or moisture, and that does not inhibit subsequent processing of the optical fiber.

BRIEF DESCRIPTION OF THE DRAWINGS

The accompanying drawings, which are hereby incorporated by reference, illustrate embodiments of the invention and together with the description serve to explain the principles of the invention.

FIG. 5 shows a plan view of a fourth embodiment of an apparatus for removing a coating according the present invention;

FIG. 6 shows a side view of the fourth embodiment shown in FIG. 5;

FIG. 7 shows a front view of the fourth embodiment shown in FIG. 5;

DETAILED DESCRIPTION OF THE PREFERRED EMBODIMENTS

Reference will now be made in detail to the presently preferred embodiments of the invention. Wherever possible, the same reference numbers will be used throughout the drawings to refer to the same or like parts.

Figure 1:
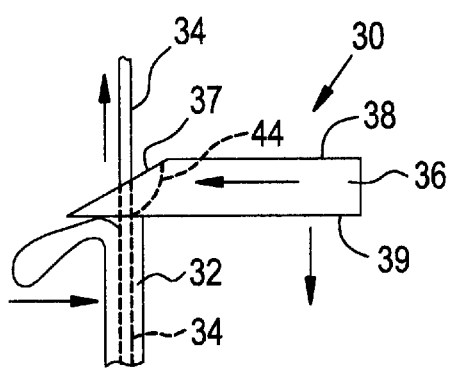
FIG. 1 shows a plan view of a first embodiment of an apparatus for removing a coating according the present invention.
Figure 2:
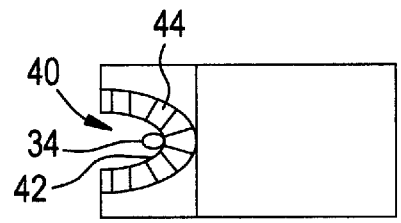
FIG. 2 shows a side view of the first embodiment shown in FIG. 1.

FIGS. 1 and 2 show a first embodiment of an apparatus 30 for removing a coating 32 from an object 34 according to the present invention. While the present invention is believed to be useful for removing a coating from a variety of objects, it is known to be particularly useful for removing a coating from a silica-containing optical fiber. Thus, to illustrate the invention, an optical fiber is shown as the object in the drawings.

The apparatus 30 includes a first tool 36, which is configured to remove the coating 32 from the object 34. In the embodiment shown in FIGS. 1 and 2, the first tool 36 has a substantially planar first surface 37 extending between substantially parallel and planar second and third surfaces 38 and 39 at oblique angles relative to the second and third surfaces 38 and 39.

As shown in FIG. 2, the first tool 36 preferably includes a notch 40 in the first and third surfaces 37 and 39 configured to receive the object 34. The notch 40 assists in maintaining the object 34 on the first tool 36.

The first tool 36 also preferably includes a cutting portion 42 configured to cut into the coating 32. In this embodiment, the cutting portion 42 is disposed within the notch 40. A beveled surface 44 can be provided to improve the cutting efficiency of the cutting portion 42.

Applying sufficient forces to the first tool 36 and the object 34 in the directions indicated by the arrows in FIG. 1 results in removal of the coating 32 from the object 34. For ease of reference, the terms vertical and horizontal, based on the orientation of the drawings, will be used to describe the directions of the forces. Sufficient forces applied in the directions indicated by the horizontally extending arrows will cause the cutting portion 42 of the first tool 36 to engage and cut into the coating 32. Sufficient forces applied in the directions indicated by the vertically extending arrows will cause relative movement between the object 34 and the first tool 36. The combined forces will result in removal of the coating 32 from the object 34.

To reduce the possibility of damage to the object 34, at least a portion of the first tool 36 that engages the object 34 has a lower hardness than the object 34. Preferably, the portion of the first tool 36 has a hardness that is less than approximately twenty percent of the hardness of the object 34 and, more preferably, is less than approximately twelve percent of the hardness of the object 34.

If the object 34 is a silica-containing optical fiber, which typically has a hardness of about five hundred and eighty on the Knoop hardness scale, and a coating 32, which typically has a hardness of less than twelve on the Knoop hardness scale, the portion of the first tool 36 preferably has a hardness of less than one hundred and twenty five on the Knoop hardness scale and, more preferably, has a hardness of less than sixty on the Knoop hardness scale.

Table 1 shows the results of tests conducted to determine the affect on optical fibers of materials of different hardness. The materials listed in Table 1 were each used to strip a protective coating from an optical fiber formed of fused quartz. The tensile strength of the stripped optical fiber was then measured using a device calibrated to NIST standards and, based on the tensile strength, it was determined whether the optical fiber had been damaged during the removal of the protective coating.

TABLE 1

| Material | Knopp Hardness KgF/mm$^2$) | Fiber Strength, Comments |
|---|---|---|
| 1) Fused silica | 578–587 | <100 Kpsi, damages fiber |
| 2) Soda Lime Glass (microscope slide) | 510–540 | <100 Kpsi, damages fiber |
| 3) Tool Steel (conventional fiber-stripping tool) | 420–460 | <100 Kpsi damages fiber |
| 4) 304 stainless steel | 280–300 | <100 Kpsi, damages fiber |
| 5) Brass | 200–230 | <100 Kpsi, damages fiber |
| 6) Copper | 136–155 | <100 Kpsi, damages fiber |
| 7) Aluminum alloy 6061-T6 | 113–125 | <100 to >200 Kpsi, marginal |
| 8) Zinc (commercially pure) | 62–70 | <100 to >200 Kpsi, marginal |
| 9) Aluminum alloy 4043 | 58–60 | <100 to >200 Kpsi, marginal |
| 10) Aluminum (commercially pure - not oxidized) | 28–30 | >200 Kpsi, no fiber damage |
| 11) polystyrene | 20–24 | >200 Kpsi, no fiber damage |
| 12) polymethylmethacrylate (acrylic) | 19–21 | >200 Kpsi, no fiber damage |
| 13) polycarbonate | 13–15 | >200 Kpsi, no fiber damage |
| 14) Sn/Cu/Ag (95.4%/4%/.5%) solder | 14–15 | >200 Kpsi, no fiber damage |
| 15) Sn/Sb (95%/5%) solder | 13–18 | >200 Kpsi, no fiber damage |
| 16) Lead (commercially pure) | <12 | >200 Kpsi, no fiber damage |

As shown by Table 1, certain soft metals can provide marginally acceptable results. Table 1 also shows that some particularly soft metals (e.g., commercially pure aluminum and lead and low melting point solders) and plastic materials (e.g., polystyrene, polymethylmethacrylate, and polycarbonate) provide very good results. Additional materials that it is presently believed will provide good results include polypropylene, a liquid crystal polymer, such as VECTRA, a polymer reinforced with an aramid fiber such as KEVLAR, and a polymer reinforced with a polyethylene fiber such as SPECTRA. These materials can be used alone or in combination. It should be noted that in applications or embodiments where a soft metal is utilized, that metal should be selected to have a hardness within the prescribed range or parameters as discussed throughout this specification, and further inherently possessing the property or being treated so as to not be susceptible to oxidation in the normal operating environment of the apparatus 50 which would otherwise produce a oxidation layer or film of unsuitable hardness or abrasiveness that could damage the optical fiber 34.

Figure 3:
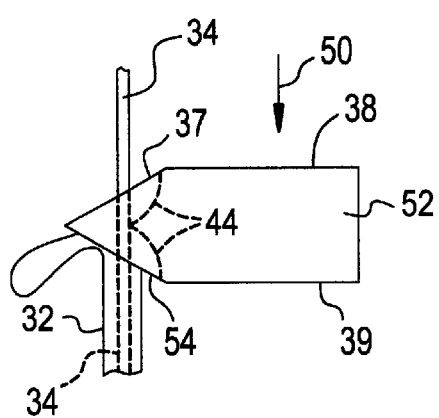
FIG. 3 shows a plan view of a second embodiment of an apparatus for removing a coating according the present invention.

FIG. 3 shows a second embodiment of an apparatus 50 according to the present invention. This second embodiment is similar to the first embodiment. In this second embodiment, however, the first tool 52 includes a fourth surface 54 extending between the first surface 37 and the third surface 39 and also has two beveled surfaces 44 that meet to form a cutting portion 42. This embodiment permits the coating 32 to be stripped from the object 34 in either direction with approximately equal cutting efficiency.

Figure 4:
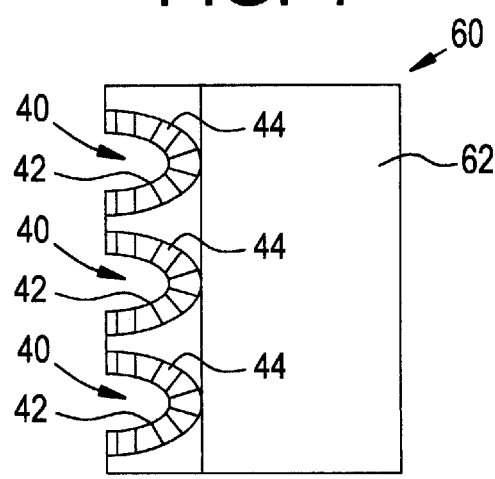
FIG. 4 shows a side view of a third embodiment of an apparatus for removing a coating according the present invention.

FIG. 4 shows a third embodiment of an apparatus 60 according to the present invention. This embodiment is essentially the same as the first embodiment, except the first tool 62 has a plurality of notches 40. Thus, even after a notch 40 becomes worn beyond its useful life, additional notches 40 on the first tool 62 can be used, thereby increasing the useful life of the first tool 62.

In the previously described first embodiment, as well as the second and third embodiments, a technician likely will directly apply the horizontal force on the object 34 needed to oppose the horizontal force applied by the first tool 36. As shown by the following fourth through sixth embodiments, however, that horizontal force can be applied by at least one additional tool.

FIGS. 5 to 7 show a fourth embodiment of an apparatus 68 according to the present invention. This embodiment includes a first tool 36 that is preferably the same as the first tool 36 of the first embodiment. The first tools 52 and 62 of the second and third embodiment, however, could also be used.

This fourth embodiment also includes a second tool 70 that applies a horizontal force to the object 34. The second tool 70 can engage the object 34 on a substantially opposite side of the object 34 from the first tool 36. The second tool 70 is offset from the first tool 36 on a downstream side of the first tool 36.

The second tool 70 preferably includes a guiding portion 72 configured to guide the object 34 without causing damage. In this embodiment, the guiding portion 72 includes a rounded edge 73.

Since the second tool 70 engages the object 34, at least the portion of the second tool 70 that engages the object 34 preferably has a hardness that will not damage the object 34. Accordingly, the portion of the second tool 70 preferably is made of a material that satisfies the hardness criteria stated above in regard to the first tool 36 of the first embodiment.

A support device 74 can be provided to support the first and second tools 36 and 70 and to bring them into engagement with the coating 32 and the object 34. The support device 74 shown in FIG. 6 includes a first handle portion 75 and a second handle portion 76. The first and second tools 36 and 70 are mounted to ends of the first and second handle portions 75 and 76 by conventional fasteners, such as bolts 80 and nuts 81.

A pivot connection 77 connects the first and second handle portions 75 and 76 while permitting relative movement there between. Pivoting the first and second handle portions 75 and 76 causes the first and second tools 36 and 70 to move toward and away from each other. The support device 74 preferably includes a restraining device 84 that limits the forces applied to the object 34 by the first and second tools 36 and 70. As shown in FIG. 6, the restraining device 84 preferably includes a first contact member 85 extending from the first handle portion 75 and a second contact member 86 extending from the second handle portion 76. When the first contact member 85 contacts the second contact member 86, the ends of the first and second handle portions 75 and 76, and thus the first and second tools 36 and 70, are prevented from moving toward each other. The restraining device 84 can be configured to prevent the first and second tools 36 and 70 from applying forces to the object 34 that would cause damage.

Figure 8:
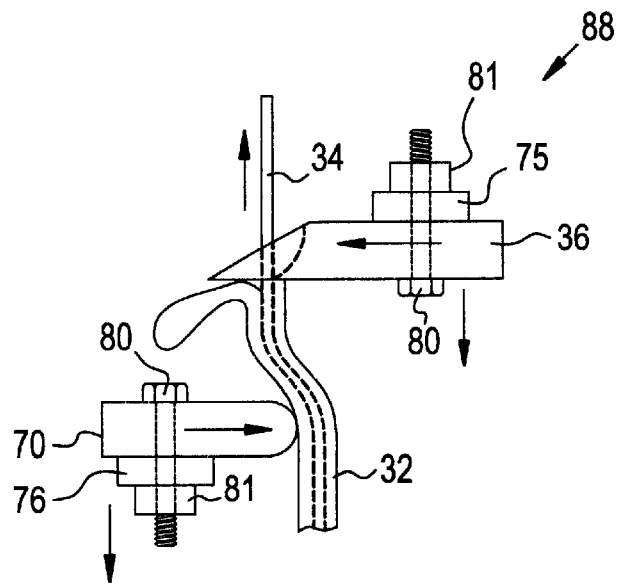
FIG. 8 shows a plan view of a fifth embodiment of an apparatus for removing a coating according the present invention.

FIG. 8 shows an apparatus 88, which constitutes a fifth embodiment of the present invention. This embodiment is similar to the fourth embodiment, except the second tool 70 is offset from the first tool 36 on an upstream side of the first tool 36. Since the second tool 70 is upstream from the first tool 36, the second tool 70 will only contact the coating 32 and, therefore, can have a hardness greater than the object 34.

Figure 9:
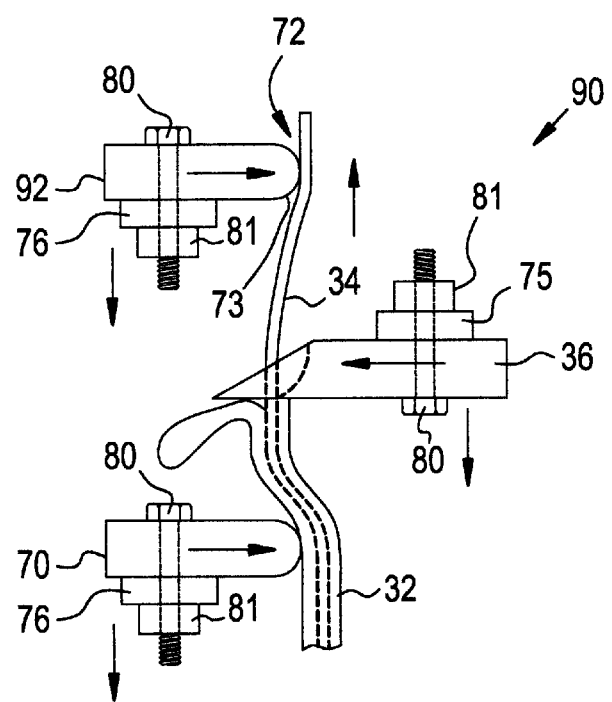
FIG. 9 shows a plan view of a sixth embodiment of an apparatus for removing a coating according to the present invention.

FIG. 9 shows a sixth embodiment of an apparatus 90 according to the present invention. This embodiment is similar to the fifth embodiment. This sixth embodiment, however, also includes a third tool 92. The third tool 92 applies a horizontal force to the object 34. The third tool 92 can engage the object 34 on a substantially opposite side of the object 34 from the first tool 36. The third tool 92 is offset from the first tool 36 on a downstream side of the first tool 36. The third tool 92 is preferably the same as the second tool 70 of the fourth embodiment, which is shown in FIG. 5. Thus, it preferably has a guiding portion 72 configured to guide the object 34, which includes a rounded edge 73.

Since the third tool 92 engages the object 34, at least the portion of the third tool 92 that engages the object 34 preferably has a hardness that will not damage the object 34. Accordingly, the portion of the third tool 92 preferably is made of a material that satisfies the hardness criteria stated above in regard to the first tool 36 of the first embodiment.

The second and third tools 70 and 92 described in connection with the previously mentioned fourth through sixth embodiments merely apply a force to the object 34. As shown in the following seventh and eighth embodiments, however, a second tool can also be configured to directly contribute to the removal of the coating 32.

Figure 10:
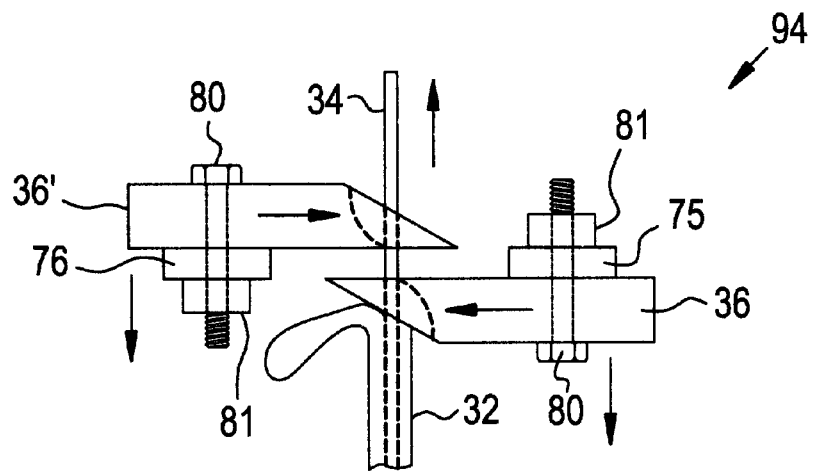
FIG. 10 shows a plan view of a seventh embodiment of an apparatus for removing a coating according to the present invention.

FIG. 10 shows an apparatus 94, which constitutes a seventh embodiment of the present invention. This embodiment includes a first tool 36 and a second tool 36', which can both be configured the same as the first tool 36 of the first embodiment. The first tools 52 and 62 of the second and third embodiments, however, also could be used.

The second tool 36' preferably is disposed on a substantially opposite side of the object 34 from the first tool 36. The first and second tools 36 and 36' both engage and cut into the coating 32. Moving the object 34 relative to the apparatus 94 will remove the coating 32.

Since both the first and second tools 36 and 36' engage the object 34, at least the portions of the first and second tools 36 and 36' that engage the object 34 preferably have a hardness that will not damage the object 34. Accordingly, the portions of the first and second tools 36 and 36' preferably are each made of a material that satisfies the hardness criteria stated above in regard to the first tool 36 of the first embodiment.

Similar to the fourth embodiment, the first and second tools 36 and 36' of this seventh embodiment can be mounted on first and second handle portions 75 and 76 of a support device 74.

Figure 11:
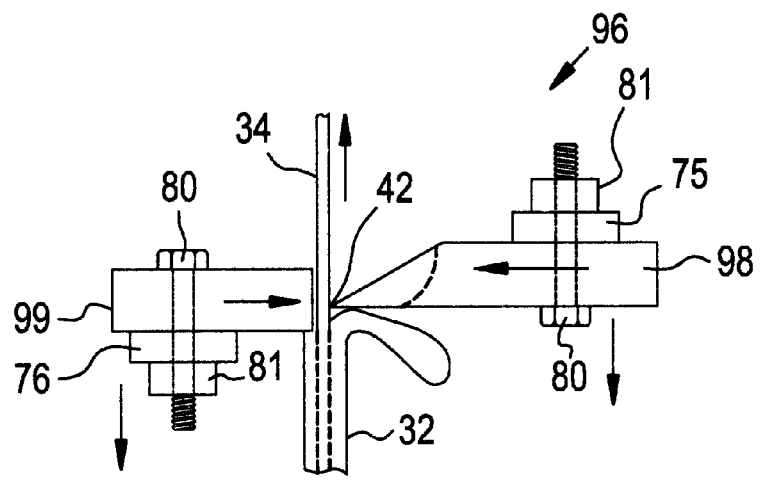
FIG. 11 shows a plan view of an eighth embodiment of an apparatus for removing a coating according to the present invention.

FIG. 11 shows an eighth embodiment of an apparatus 96 according to the present invention. This embodiment includes a first tool 98 and a second tool 99 disposed substantially opposite the first tool 98. In this embodiment, the first tool 98 has cutting portion 42 but does not have a notch.

The first and second tools 98 and 99 both engage the coating 32. Initially, only the cutting portion 42 of the first tool 98 cuts into the coating 32. When the object 34 is moved relative to the first and second tools 98 and 99, however, both the first and second tools 98 and 99 engage the coating 32 and remove it from the object 34.

Since both the first and second tools 98 and 99 engage the object 34, at least the portions of the first and second tools 98 and 99 that engage the object 34 preferably have a hardness that will not damage the object 34. Accordingly, the portions of the first and second tools 98 and 99 are preferably each made of a material that satisfies the hardness criteria stated above in regard to the first tool 36 of the first embodiment.

Similar to the fourth embodiment, the first and second tools 98 and 99 of this eighth embodiment are preferably mounted on first and second handle portions 75 and 76 of a support device 74.

FIGS. 12, 13, 14, and 15 show an apparatus 101, which constitutes a ninth embodiment of the present invention. This embodiment includes a plurality of first tools 52 and a second tool 102 that are disposed on a first handle portion 103 and a second handle portion 104, respectively, of a support device 105.

Figure 13:
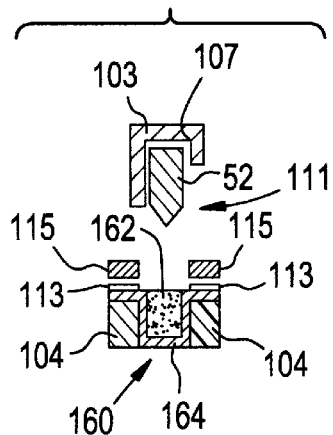
FIG. 13 shows a cross-sectional view of the ninth embodiment taken along line 13—13 of FIG. 12.
Figure 14:
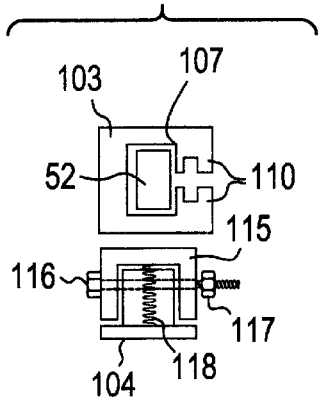
FIG. 14 shows a view of the ninth embodiment taken along line 14—14 of FIG. 12.
Figure 15:
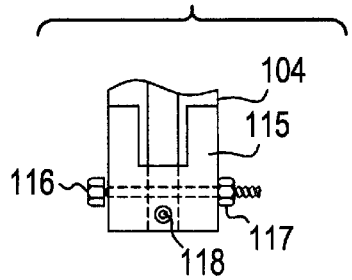
FIG. 15 shows a view of the ninth embodiment taken along line 15—15 of FIG. 12.

Each of the first tools 52 is preferably configured substantially the same as the first tool 52 of the second embodiment. As shown in FIGS. 13 and 14, the first tools 52 are connected together and slidable within a guide hole 107 of the first handle portion 103.

A knob 108 can be connected to the first tools 52 to permit control over the position of the first tools 52 within the guide hole 107. The knob 108 preferably has restrainers 109 that extend into guide grooves 110 in the first handle portion. As the first tool 52 in the operative position 111 wears out, the knob 108 can be moved to position a new first tool 52 in the operative position 111.

The second tool 102 is disposed substantially opposite the first tool 52 in the operative position 111. The second tool 102 can have a substantially V-shaped groove 113 for guiding the object 34. The second tool 102 can also have a recess for receiving the first tool 52 in the operative position 111.

A flip-over clamp 115 can be provided on the second handle portion 104 to hold the object 34 within the V-shaped groove 113 of the second tool 102. This clamp 115 is connected to the second handle portion 104 by a bolt 116 and a nut 117 that allow the clamp 115 to pivot between opened and closed positions. A spring 118 biases the clamp 115 toward the closed position. The clamp 115 preferably has a conventional ball and detent mechanism (not shown) to maintain it in either the opened or closed position.

Since both the first and second tools 52 and 102 may engage the object 34, they both preferably have at least a portion with a hardness that will not damage the object 34. Accordingly, the portions of the first and second tools 52 and 102 preferably are each made of a material that satisfies the hardness criteria stated above in regard to the first tool 36 of the first embodiment. In the case of the second tool 102, the portion can be provided, for example, by forming the entire second handle portion 76 of a sufficiently soft material or by providing an insert made of a sufficiently soft material.

Figure 12:
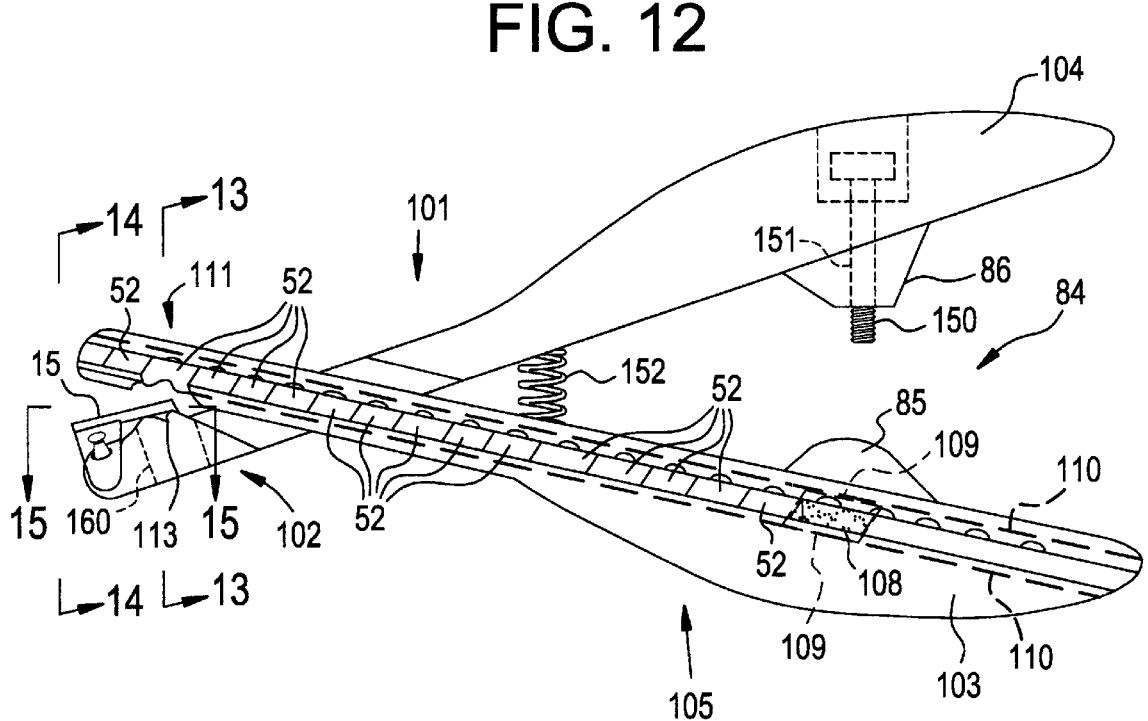
FIG. 12 shows a side view of a ninth embodiment of an apparatus for removing a coating according to the present invention.

The support device 105 can include a restraining device 84 that limits an amount of force that the first and second tools 52 and 102 can apply to the object 34. As shown in FIG. 12, the restraining device 84 can include a first contact member 85 extending from the first handle portion 103 and a second contact member 86 extending from the second handle portion 104. The second contact member 86 preferably includes a bolt 150 that extends through a threaded hole 151 in the second handle portion 104. The bolt 150 can be turned to adjust the amount of its extension from the second handle portion 104. When the bolt 150 of the second contact member 86 contacts the first contact member 85, the ends of the first and second handle portions 103 and 104, and thus the first and second tools 52 and 102, are prevented from moving toward each other. By adjusting the extension of the bolt 150, the restraining device 84 can be configured to prevent the first and second tools 52 and 102 from applying forces to the object 34 that would cause damage.

A spring 152 can be provided to bias the first and second handle portions 103 and 104 away from each other. Thus, in the non-operative state, the ends of the first and second tools 52 and 102 are spaced from each other.

Figure 16:
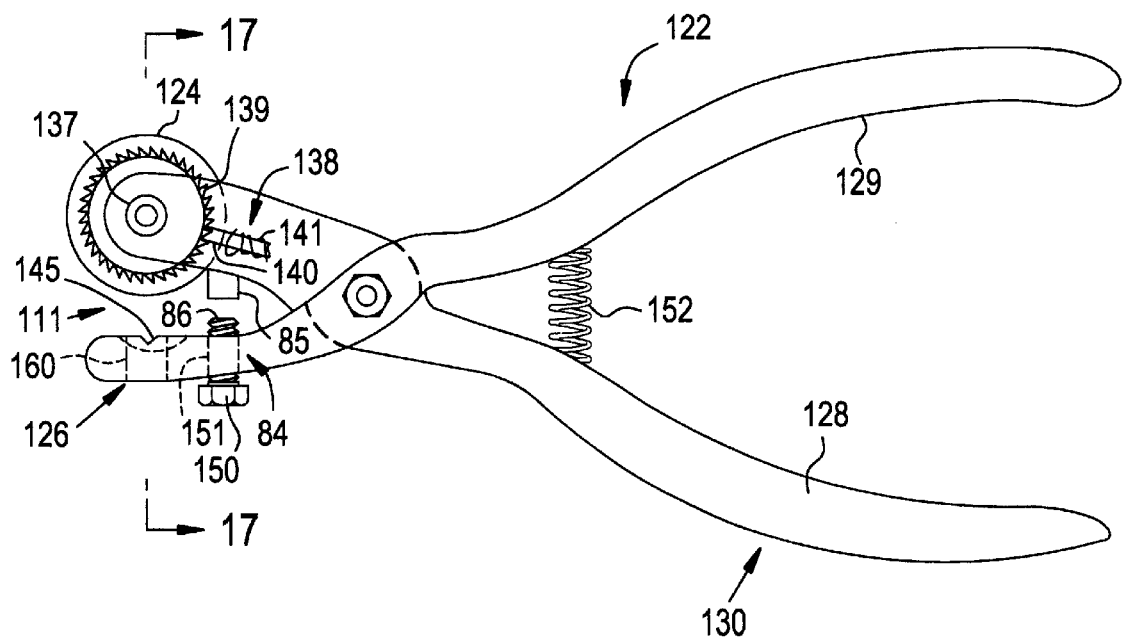
FIG. 16 shows a side view of a tenth embodiment of an apparatus for removing a coating according to the present invention.
Figure 17:
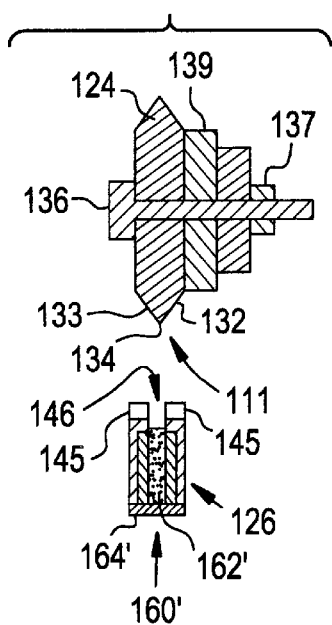
FIG. 17 shows a cross-sectional view of the tenth embodiment taken along line 17—17 of FIG. 16.

FIGS. 16 and 17 show an apparatus 122, which constitutes a tenth embodiment of the present invention. This embodiment includes a first tool 124 and a second tool 126 that are disposed on a first handle portion 128 and a second handle portion 129, respectively, of a support device 130.

The first tool 124 can be in the form of a disk having a plurality of portions for engaging the object 34. As shown in FIG. 17, the first tool 124 preferably includes a first surface 132 and a second surface 133 that meet to form a cutting portion 134.

The first tool 124 can be rotatably mounted to the first handle portion 128 by a bolt 136 and a nut 137. A detent mechanism 138 has a plunger 140 that meshes with teeth 139 on the first tool 124 to hold a portion of the first tool 124 in an operative position 111. The detent mechanism 138 includes a spring 141 for biasing the plunger 140 toward the teeth 139. After a portion of the first tool 124 in the operative position 111 has worn out, the first tool 124 can be rotated to position a new portion in the operative position 111.

The second tool 126 is disposed substantially opposite the portion of the first tool 124 in the operative position 111. The second tool 126 can have a substantially V-shaped groove 145 for guiding the object 34. The second tool 126 can also have a recess 146 for receiving the portion of first tool 124 in the operative position 111.

Since both the first and second tools 124 and 126 engage the object 34, they both preferably have at least a portion with a hardness that will not damage the object 34. Accordingly, the portions of the first and second tools 124 and 126 preferably are each made of a material that satisfies the hardness criteria stated above in regard to the first tool 36 of the first embodiment. In the case of the second tool 126, the portion can be provided, for example, by forming the entire second handle portion 129 of a sufficiently soft material or merely by providing an insert made of a sufficiently soft material.

The support device 130 can include a restraining device 84 that limits an amount of force that the first and second tools 124 and 126 can apply to the object 34. As shown in FIG. 16, the restraining device 84 can include a first contact member 85 extending from the first handle portion 128 and a second contact member 86 extending from the second handle portion 129. The second contact member 86 preferably includes a bolt 150 that extends through a threaded hole 151 in the second handle portion 129. The bolt 150 can be turned to adjust the amount of its extension from the second handle portion 129. When the bolt 150 of the second contact member 86 contacts the first contact member 85, the ends of the first and second handle portions 128 and 129, and thus the first and second tools 124 and 126, are prevented from moving toward each other. By adjusting the extension of the bolt 150, the restraining device 84 can be configured to prevent the first and second tools 124 and 126 from applying forces to the object 34 that would cause damage.

A spring 152 can be provided to bias the ends of the first and second handle portions 128 and 129 away from each other. Thus, in the non-operative state, the first and second tools 124 and 126 are spaced from each other.

Figure 18:
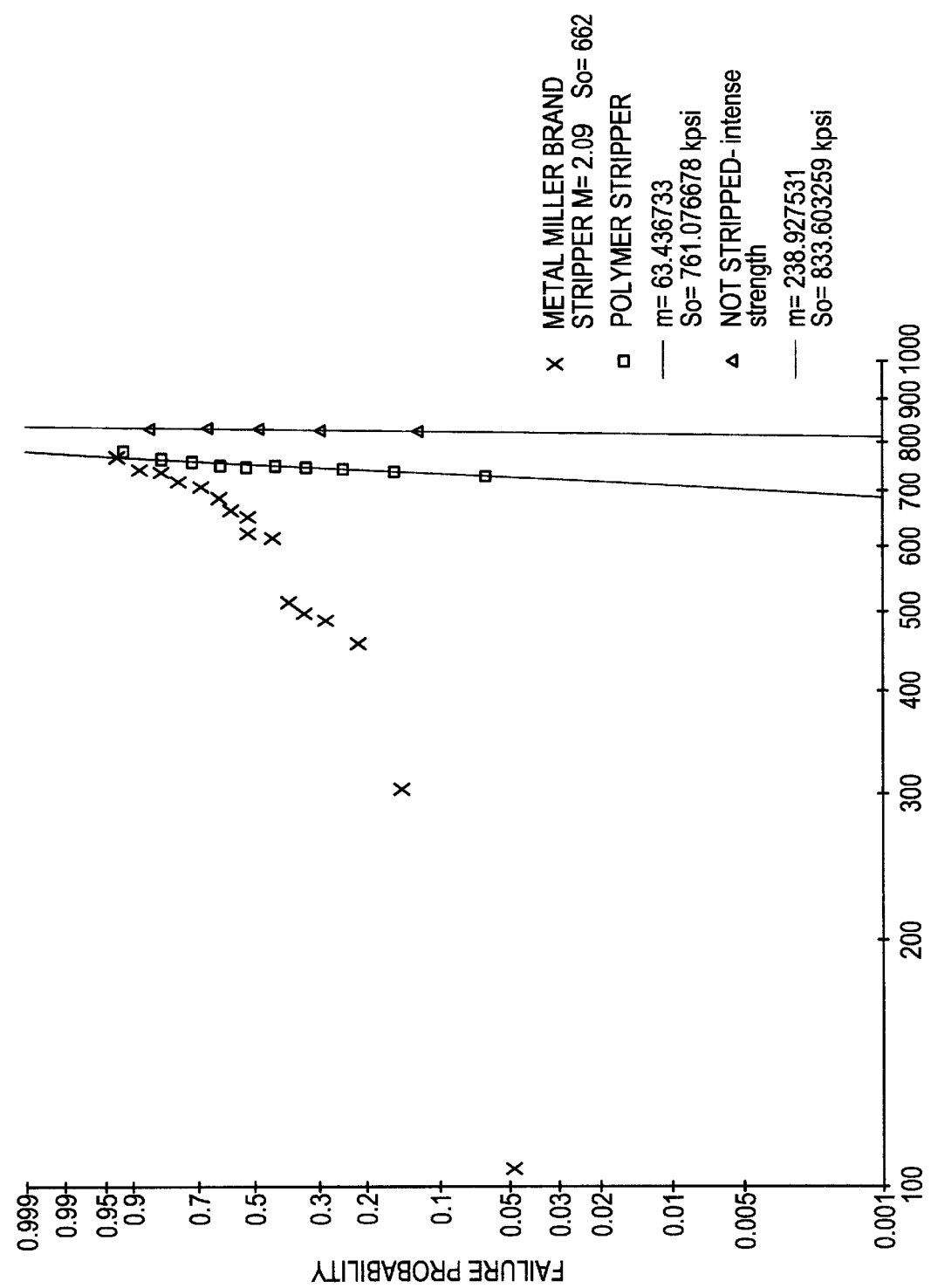
FIG. 18 plots the results of tensile-strength tests of coated optical fibers and optical fibers from which the protective coatings were removed by an apparatus according to the present invention and by a conventional fiber-stripping tool.

FIG. 18 shows an advantage of the present invention. FIG. 18 contains Weibull plots of the results of tensile strength tests conducted on (1) coated optical fibers, (2) optical fibers from which the coatings were removed by an apparatus constructed in accordance with the first embodiment of the present invention having a polymethylmethacrylate tool, and (3) optical fibers from which coatings were removed by a conventional fiber-stripping tool having metal blades with a hardness of about 420 to 460 on the Knoop hardness scale. As shown in FIG. 18, coated optical fibers do not have a significant probability of failure until about 800 Kpsi. Optical fibers stripped with the apparatus constructed in accordance with the present invention do not have a significant probability of failure until about 700 Kpsi. In contrast, optical fibers stripped with the conventional fiber-stripping tool have a significant probability of failure as low as about 100 Kpsi.

Figure 19:
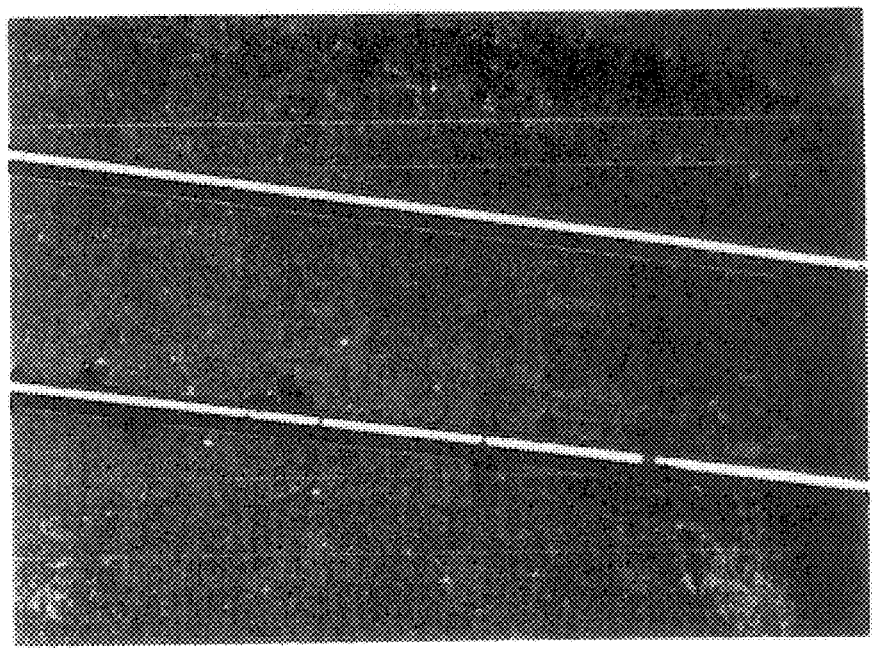
FIG. 19 is a copy of a photograph of optical fibers from which the protective coatings were removed by an apparatus according to the present invention and by a conventional fiber-stripping tool.

FIG. 19 is a copy of a photograph of a magnified (20×) view of optical fibers. The coating was removed from the upper optical fiber by the apparatus constructed in accordance with the first embodiment of the present invention. The coating was cleanly stripped from this optical fiber. The coating was removed from the lower optical fiber by the conventional fiber-stripping tool. The conventional fiber-stripping tool left a significant amount of coating residue on the optical fiber. The residue can be removed from the optical fiber with a cloth, but this is believed to cause additional damage to the optical fiber.

Figure 20:
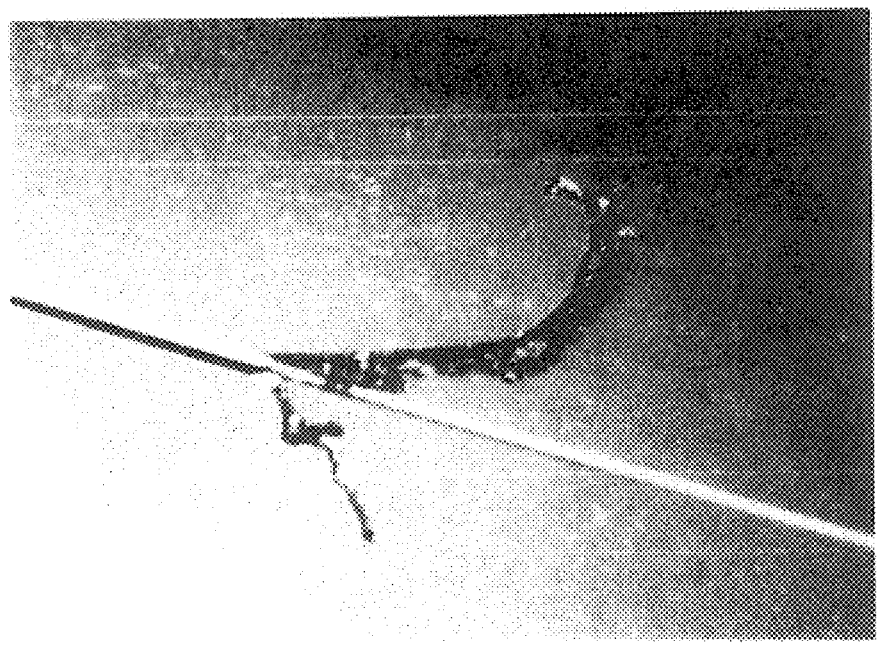
FIG. 20 is a copy of a photograph of an optical fiber from which the protective coating was removed by an apparatus according to the present invention.

FIG. 20 is a copy of a photograph of a magnified view (10×) of another optical fiber from which the coating was removed by the apparatus constructed in accordance with the first embodiment of the present invention. The coating 32 was cleanly peeled from the optical fiber.

An uncoated portion of an optical fiber, i.e., a portion from which a protective coating 32 was removed or a portion that was never coated, can be damaged by airborne particulates that lodge on the optical fiber and create flaws in the optical fiber, which become break sources. The uncoated portion can also be damaged by moisture deposited on its surface. Thus, it is desirable to have a technique for inhibiting such damage to an uncoated portion of the optical fiber. The present invention provides such a technique.

In accordance with the invention, a substance is applied to at least a portion of the optical fiber to form a protective layer. The substance provides a barrier to at least one of particulates and moisture (preferably both) and does not inhibit subsequent processing of the optical fiber. Examples of subsequent processing include writing a grating (e.g., a Bragg grating or a long period grating) using deep ultraviolet light (248 nanometers), splicing, fusing, frit attaching to a substrate, and insertion into a connector.

Such subsequent processing can be accommodated by, for example, selecting a substance that is transparent to deep ultraviolet light. Additionally, subsequent processing can be accommodated by selecting a substance that will form a layer having a thickness of less than one hundred nanometers, preferably less than seventy nanometers, and more preferably less than fifty nanometers.

The substance preferably will not adversely affect the optical properties of the optical fiber. Also, the substance preferably will form a bond with the optical fiber. The bond can be, for example, a covalent bond, an ionic bond, or a bond due to van der Waal forces. If the optical fiber contains silica, it is presently preferred that the substance establish a covalent bond by forming a self-assembled monolayer on the optical fiber.

Preferred substances have a hydrocarbon or fluorocarbon functionality and include silane monomers or oligomers. Examples include hydrocarbon silanes, fluorocarbon silanes, epoxy functional silanes, acrylate functional silanes, amine functional silanes, thiol functional silanes, phenyl functional silanes, and any combination of the above. For example, a small amount of acrylate or thiol silane mixed with a hydrocarbon silane would provide both protection to the optical fiber and permit further bonding of the optical fiber to a conventional acrylate fiber coating.

Hydrocarbon silane ($C_{18}H_{37}$—$Si(OR)_3$) and fluorocarbon silane ($C_{3-10}F_n$—$CH_2CH_2$—$Si(OR)_3$) are specific examples of substances that each meet the preferred requirements stated above. The thickness of a layer of each of these substances is believed to be less than one hundred nanometers because each substance starts as a monomer capable of forming a monolayer (about three nanometers thick). It is possible, however, that the layer is thicker because an oligomer may form.

Through testing, it has been determined that an unprotected optical fiber will have a tensile strength of less than fifty Kpsi if placed in an environment where it is exposed to particulates and/or moisture. When an optical fiber is coated with hydrocarbon silane, however, it can maintain a tensile strength of more than several hundred Kpsi after being placed in such an environment.

When removing a protective coating from an optical fiber, it is preferable to apply the substance to the optical fiber as quickly as possible to decrease the possibility of damage to the optical fiber. Thus, for example, when removing the coating 32 with the first tool 36, it is desirable to provide the substance on the first tool 36 such that the substance will be applied to at least a portion of the optical fiber as the coating 32 is removed.

The ninth and tenth embodiments of the invention include preferred structures for applying a substance to an optical fiber 34 as the coating 32 is removed. In each of these embodiments, a reservoir 160 and 160' for the substance is provided in the second handle portion 104 and 129. As shown in FIGS. 13 and 17, the reservoir 160 and 160' of each embodiment includes a sponge 162 and 162', which contains the substance, disposed within a replaceable insert 164 and 164'. The substance is applied to the optical fiber 34 as it passes through the reservoir 160 and 160'.

In both embodiments, a conventional indicator material can be used to indicate when the reservoir 160 and 160' has run dry. Methylene blue, for example, can be added to the substance to give the substance a blue color. The absence of a blue color from the reservoir 160 and 160' indicates that the substance has been drained from the reservoir 160 and 160'.

It will be apparent to those skilled in the art that various modifications and variations can be made in the above-described embodiments of the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for removing a protective coating from a glass optical fiber at ambient temperature and without exposure to a chemical softening agent, the glass optical fiber and the protective coating each having a hardness which are different from one another, the method comprising the steps of:

providing a tool having a blade, at least a portion of the blade having a hardness sufficiently lower than that of the glass optical fiber to prevent damage to the glass optical fiber in the event of contact with the portion of the blade, and sufficiently higher than that of the protective coating such that the blade portion can penetrate the protective coating upon contact without undue deformation of the portion of the blade;

engaging a portion of the protective coating surrounding the glass optical fiber with the portion of the blade; and applying sufficient pressure on the blade to force the blade into the protective coating, and in turn force the protective coating off a portion of the glass optical fiber;

wherein the portion of the blade is fabricated from a material that is either not susceptible to oxidation or is treated to resist oxidation, and is selected from a group consisting of commercially pure aluminum, a low-melting-point solder, or a commercially pure lead.

2. The method of claim 1 wherein the hardness of the portion of the blade is less than approximately twenty percent of the hardness of the glass optical fiber.

3. The method of claim 1 wherein the hardness of the portion of blade is less than approximately twelve percent of the hardness of the glass optical fiber.

4. The method of claim 1 wherein the glass optical fiber is silica.

5. The method of claim 4 wherein the hardness of the portion of the blade is less than approximately 125 on the Knoop hardness scale.

6. The method of claim 4 wherein the hardness of the portion of the blade is less than approximately 60 on the Knoop hardness scale.

7. The method of claim 1 wherein the step of engaging the protective coating includes cutting into at least a portion of the protective coating with the portion of the blade.

8. The method of claim 1 wherein a portion of the glass optical fiber is exposed when the protective coating is removed, and further comprising the step of:

Applying a substance to the portion of the glass optical fiber, which is exposed to form a protective layer thereon.

9. The method of claim 8 wherein the substance forms a self-assembled monolayer on the glass optical fiber.

10. The method of claim 9 wherein the glass optical fiber is silica and the substance is selected from a group consisting of: a hydrocarbon silane, a fluorocarbon silane, an epoxy functional silane, an acrylete functional silane, an amnine functional silane, a thiol functional silane, or a phenyl functional silane.

11. A method for removing a protective coating from a glass optical fiber at ambient temperature and without exposure to a chemical softening agent, the glass optical fiber and the protective coating each having a hardness which are different from one another, the method comprising the steps of:

providing a tool having a blade, at least a portion of the blade having a hardness sufficiently lower than that of the glass optical fiber to prevent damage to the glass optical fiber in the event of contact with the portion of the blade, and sufficiently higher than that of the protective coating such that the blade portion can penetrate the protective coating upon contact without undue deformation of the portion of the blade, the portion of the blade being fabricated from a polymeric material or a soft metal;

engaging a portion of the protective coating surrounding the glass optical fiber with the portion of the blade; and applying sufficient pressure on the blade to force the blade into the protective coating, and in turn force the protective coating off a portion of the glass optical fiber;

wherein a portion of the glass optical fiber is exposed when the protective coating is removed, and further comprising the step of:

providing on the tool a substance that is applied to the portion of the glass optical fiber, which is exposed to form a protective layer thereon.

12. The method of claim 11 wherein the substance forms a self-assembled monolayer on the glass optical fiber.

13. The method of claim 12 wherein the glass optical fiber is silica and the substance is selected from a group consisting of: a hydrocarbon silane, a fluorocarbon silane, an epoxy functional silane, an acrylete functional silane, an amine functional silane, a thiol functional silane, or a phenyl functional silane.

14. A method of inhibiting damage to an exposed region of a glass optical fiber from which a protective coating has been stripped, the method comprising the step of:

applying a substance to at least the exposed region of the glass optical fiber to form a protective layer that provides a barrier to at least one of particulates and moisture, and which does not inhibit subsequent processing of the glass optical fiber.

15. The method of claim 14 wherein the substance forms a self-assembled monolayer on the glass optical fiber.

16. The method of claim 15 wherein the glass optical fiber is silica and the substance is selected from a group consisting of: a hydrocarbon silane, a fluorocarbon silane, an epoxy functional silane, an acrylete functional silane, an amine functional silane, a thiol functional silane, or a phenyl functional silane.

17. An apparatus for removing a protective coating from a silica-containing optical fiber, the protective coating having a hardness, the apparatus comprising:

a tool having a blade and a gripping portion, the tool being configured such that the blade engages the protective coating of the silica-containing optical fiber in a region from which the protective coating is to be removed, at least a portion of the blade having a hardness greater than that of the protective coating but less than approximately 125 on the Knoop hardness scale;

wherein the portion of the blade is fabricated from a material that is either not susceptible to oxidation or is treated to resist oxidation, and is selected from a group consisting of commercially pure aluminum, a low-melting-point solder, or a commercially pure lead.

18. An apparatus for removing a protective coating from a silica-containing optical fiber, the protective coating having a hardness, the apparatus comprising:

a tool having a blade and a gripping portion, the tool being configured such that the blade engages the protective coating of the silica-containing optical fiber in a region from which the protective coating is to be removed, at least a portion of the blade having a hardness greater than that of the protective coating but less than approximately 125 on the Knoop hardness scale;

wherein the protective coating is removed from the optical fiber to produce an exposed region, and a substance is applied to the exposed region, the apparatus further comprising:

a reservoir connected to the tool for receiving the substance, wherein the reservoir is configured to apply the substance to the exposed region of the silica-containing optical fiber as the protective coating is removed to form a protective layer on the exposed region of the silica-containing optical fiber.

* * * * *